(12) United States Patent
Kuipers

(10) Patent No.: US 8,132,764 B2
(45) Date of Patent: Mar. 13, 2012

(54) QUICK-RELEASE ADJUSTABLE MOUNTING BRACKET

(76) Inventor: Ray Kuipers, Rancho Santa Margarita, CA (US)

( * ) Notice: Subject to any disclaimer, the term of this patent is extended or adjusted under 35 U.S.C. 154(b) by 492 days.

(21) Appl. No.: 12/322,832

(22) Filed: Feb. 9, 2009

(65) Prior Publication Data
US 2010/0200715 A1 Aug. 12, 2010

(51) Int. Cl.
*F16M 3/08* (2006.01)
*F16L 25/00* (2006.01)

(52) U.S. Cl. ....... 248/74.3; 248/230.8; 24/273; 285/420

(58) Field of Classification Search ............... 248/311.2, 248/313, 316.1, 316.7, 230.1, 230.7, 230.8, 248/74.3, 228.8; 24/273, 530, 70 SK, 68 R, 24/69 R, 69 ST; 403/165, 167, 169, 385, 403/397; 285/328, 373, 419, 409, 420, 423; 224/271–272, 667, 669, 930; 174/75 C
See application file for complete search history.

(56) References Cited

U.S. PATENT DOCUMENTS

| | | | | |
|---|---|---|---|---|
| 3,999,825 A * | 12/1976 | Cannon | ......................... | 285/373 |
| 4,453,290 A * | 6/1984 | Riedel | ......................... | 24/70 SK |
| 4,632,221 A * | 12/1986 | Stanford | .................... | 182/186.8 |
| 4,660,870 A * | 4/1987 | Donley | ......................... | 285/419 |
| 4,918,790 A * | 4/1990 | Cirket et al. | ................... | 24/71 R |
| 5,259,690 A * | 11/1993 | Legge | ............................ | 403/385 |
| 5,305,978 A * | 4/1994 | Current | ....................... | 248/230.4 |
| 5,427,465 A * | 6/1995 | Sato | ................................ | 403/49 |
| 6,168,345 B1 * | 1/2001 | Legge | ............................ | 403/385 |
| 6,828,504 B1 * | 12/2004 | Schmidt | ....................... | 174/75 C |
| 7,147,398 B2 * | 12/2006 | Liew et al. | ..................... | 403/169 |
| 7,241,071 B2 * | 7/2007 | Carraher et al. | .............. | 403/164 |
| 7,805,814 B2 * | 10/2010 | Cho | ............................. | 248/74.3 |

* cited by examiner

*Primary Examiner* — Tan Le
(74) *Attorney, Agent, or Firm* — Morland C. Fischer

(57) ABSTRACT

A quick-release adjustable mounting bracket to be detachably connected to, for example, a handlebar of a bicycle to permit, for example, a bright flashing light source to be attached to and removed from the handlebar without the use of tools so that neither the mounting bracket nor the light source need remain attached when the bicycle is not in use. The mounting bracket includes a grip to engage a portion of the handlebar and a light stand pivotally coupled to the grip. The light source is removably received by the light stand so that the light stand and the light source received thereby are rotatable relative to the grip. The grip includes a hook-shaped locking catch, a coupling cavity within which a plurality of spaced, parallel-aligned coupling pin retaining slots are formed, and a flexible clamping band. A locking latch pivotally coupled to a first end of the flexible clamping band is pulled towards and rotated into locking engagement with the locking catch. The flexible clamping band is adapted to be bent over the locking bar, whereby a coupling pin carried by the opposite end of the clamping band is releasably connected to one of the plurality of coupling pin retaining slots in the grip depending upon the size (e.g., diameter) of the handlebar to which the mounting bracket is to be detachably connected.

20 Claims, 5 Drawing Sheets

QUICK-RELEASE ADJUSTABLE MOUNTING BRACKET

BACKGROUND OF THE INVENTION

1. Field of the Invention

This invention relates to an adjustable quick-release mounting bracket by which a light source can be detachably connected to a bicycle handlebar or a similar mobile or stationary structural member. The quick-release mounting bracket can be easily removed from the handlebar so that neither the mounting bracket nor the light source need remain attached when the bicycle is not in use.

2. Background Art

It is often desirable to be able to connect a bright flashing light source to a bicycle so that the presence of the bicycle and its rider will be known to roadway traffic particularly while riding during darkness. A problem common to conventional light source connectors is their inability to be mounted on different structural members of the bicycle having a variety of different sizes (e.g., diameters). That is to say, the conventional connectors are not easily adjustable to fit different locations on the bicycle.

To overcome this problem, shims have sometimes been used to enable conventional connectors to be mounted on structural members of varying size. Nevertheless, tools (e.g., a screwdriver) are often required in order to attach the connector to the bicycle. Because of the inconvenience and time required to first attach and then remove the light source connector, the connector and the light source carried thereby are sometimes left on the bicycle during those times when the bicycle is not in use. Consequently, the light source and/or the connector are subjected to theft which requires that the user purchase a replacement.

In other cases, the light source connectors include straps that are manufactured from a flexible fabric material to be wrapped around a part of the bicycle. Velcro hook-and-loop fasteners are usually employed to hold the ends of the fabric straps together. However, such fabric straps and Velcro fasteners are not particularly strong and reliable. Consequently, the fabric straps may loosen and rotate around the part of the bicycle to which they are attached so that the position of the light source is undesirably changed. Similarly, the Velcro hook-and-loop fasteners may inadvertently separate, whereby the strap will simply fall off the bicycle which results in the connector and the light source being lost.

Accordingly, it would be desirable to have available a quick-release mounting bracket by which a light source (or other auxiliary device) can be quickly, easily and reliably attached to a bicycle without the use of tools and removed from the bicycle so that neither the mounting bracket nor the light source need remain attached when the bicycle is not in use.

SUMMARY OF THE INVENTION

In general terms, an adjustable quick-release mounting bracket is disclosed having an application, for example, for attaching a commercially-available flashing light source to a handlebar of a bicycle. The quick-release mounting bracket can be easily attached to and removed from the handlebar without the use of tools so that neither the mounting bracket nor the light source carried thereby need remain attached at those times when the bicycle is not in use.

The mounting bracket includes a light stand to which the light source is removably connected and a grip to be held against a handlebar of the bicycle. The grip includes a light stand support body to which the light stand is pivotally connected, a flexible clamping band, and a locking latch. The locking latch is pivotally connected to a first end of the clamping band, and a coupling pin is carried at the opposite end thereof. The light stand is rotatable relative to the light stand support body so that the light source connected to the light stand is correspondingly rotatable to suit the needs and circumstances of the user. A hook-shaped locking catch projects from one end of the light stand support body of the grip. A coupling cavity is located at the opposite end of the light stand support body. The coupling cavity includes a series of spaced, parallel-aligned coupling pin retaining slots formed therein.

In order to attach the mounting bracket to the bicycle, the grip is first moved against the handlebar. The flexible clamping band is then bent over the handlebar such that the locking latch at the first end of the clamping band is pulled towards and rotated into releasable mating engagement with the hook-shaped locking catch. The locking pin at the opposite end of the clamping band is snapped into removable receipt by a particular one of the coupling pin retaining slots formed in the coupling cavity of the light stand support body depending upon the diameter of the handlebar. The adjustable mounting bracket is thereby held in surrounding engagement with the handlebar until the locking latch is rotated out of engagement and released from the locking catch, whereby the first end of the clamping band is separated from the locking catch.

DESCRIPTION OF THE PREFERRED EMBODIMENT

Figure 9:
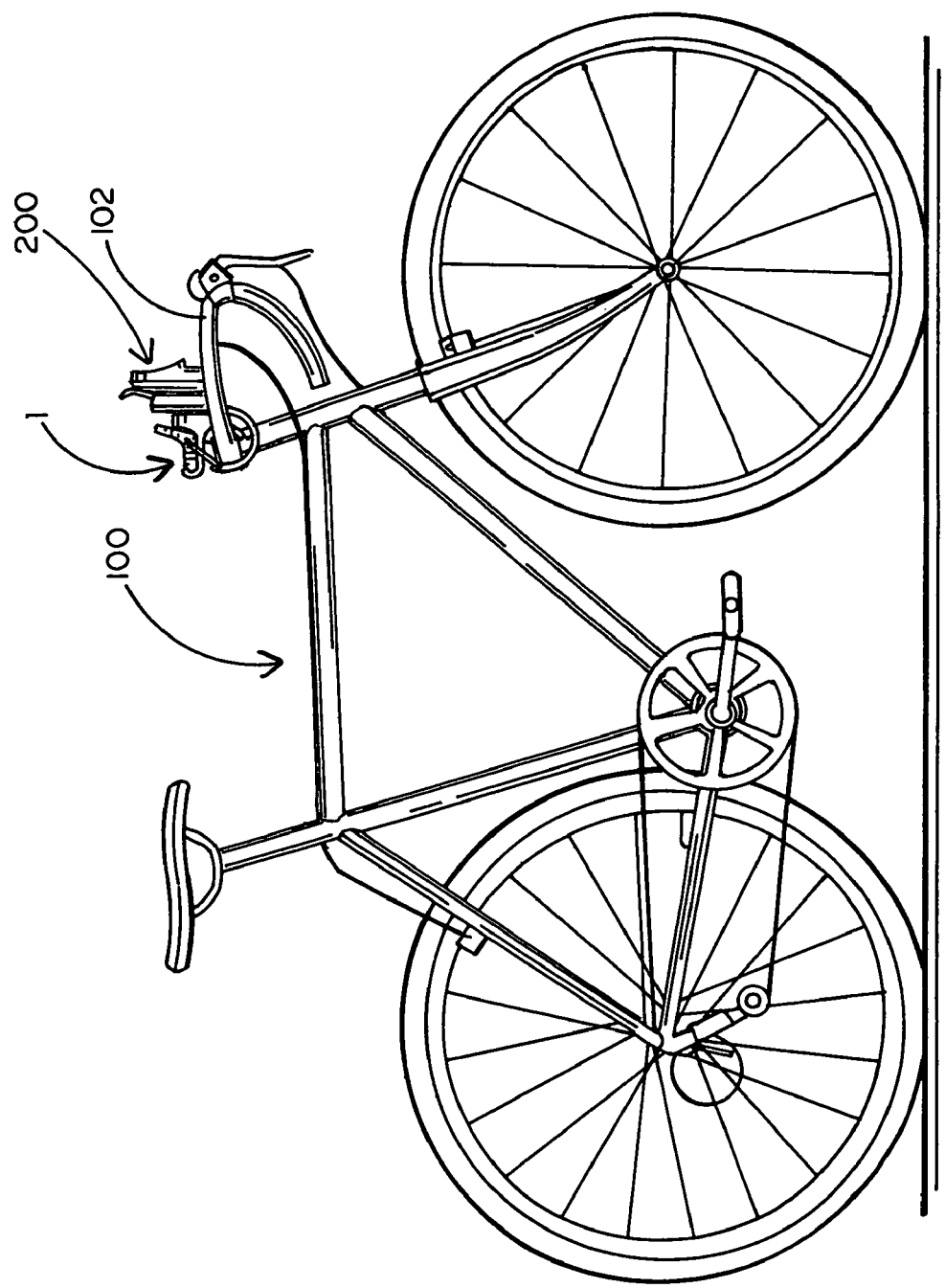
FIG. 9 shows a bicycle with the adjustable mounting bracket detachably connected in surrounding engagement with a handlebar thereof so that the light source of FIGS. 7 and 8 can be carried with the bicycle.

A preferred embodiment for a quick-release adjustable mounting bracket 1 according to the present invention is disclosed while referring to the drawings. As is best shown in FIG. 9, the adjustable mounting bracket 1 has particular application to be detachably connected to a structural member (e.g., a handlebar 102) of a bicycle 100. In this same regard, the mounting bracket 1 is adapted to be coupled to a commercially-available flashing bright light source 200 so that the light source can be attached to and carried by the bicycle 100 in order to call attention to the presence of a rider to those traveling on a roadway or bike path. As will soon be disclosed, by virtue of the quick-release adjustable mounting bracket 1 herein disclosed, the light source 200 can be easily removed from the bicycle 100 and/or mounted on different parts of the bicycle so as to be visible to those nearby. However, it is to be understood that the bicycle 100 shown in FIG. 9 to which the mounting bracket 1 is detachably connected is intended to form no part or limitation of the present invention, such that the adjustable nature of the mounting bracket facilitates its connection to other round and flat structural members, whether stationary or mobile, such as those associated with motor vehicles, boats, railings, and the like.

Details for the quick-release adjustable mounting bracket 1 are now described while referring concurrently to FIGS. 1-8 of the drawings. The mounting bracket 1 is, for example, manufactured from impact-resistant plastic and includes a grip 3 and a light stand 5 where the light stand 5 is coupled to and rotatable with respect to the grip 3. In a preferred embodiment (best shown in FIGS. 6-8), the aforementioned light source 200 is removably connected to the light stand 5. The grip 3 includes a light stand support body 7, a clamping band 9, and a locking latch 10. As will be described in greater detail hereinafter, the clamping band 9 is removably coupled to the light stand support body 7, and the locking latch 10 is pivotally coupled to the clamping band 9.

Figure 1:
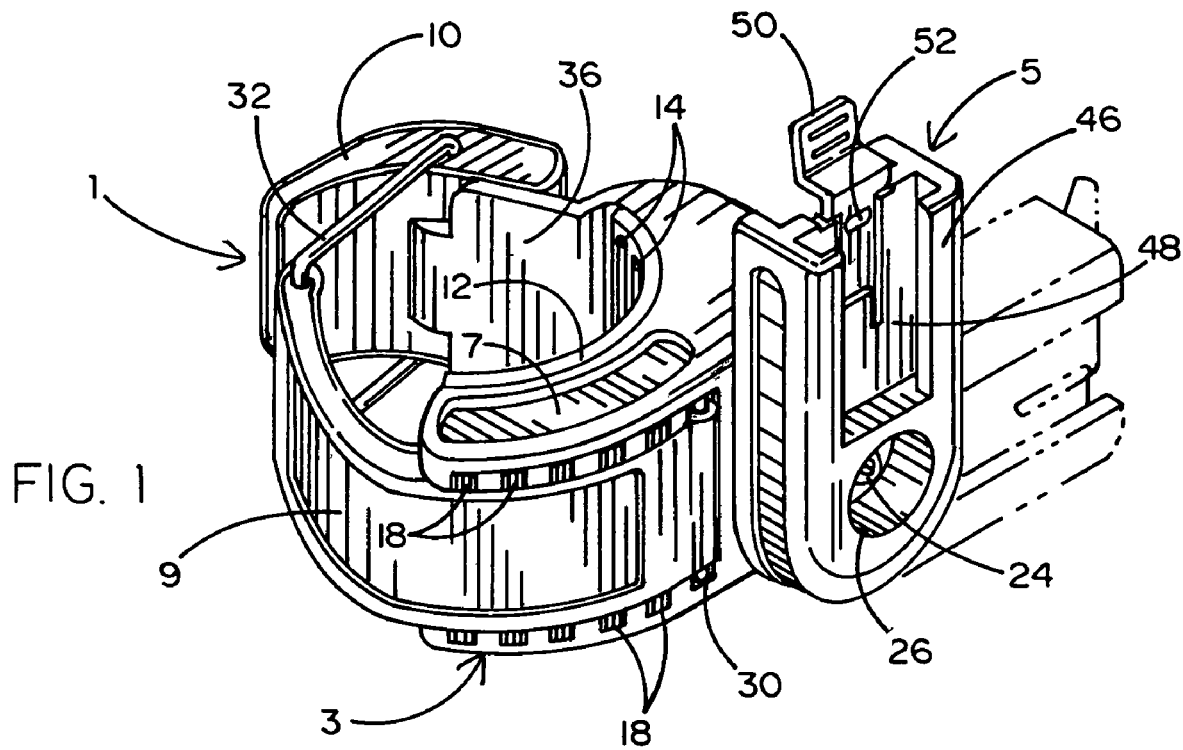
FIG. 1 is a perspective view of a quick-release adjustable mounting bracket according to a preferred embodiment of the present invention.
Figure 2:
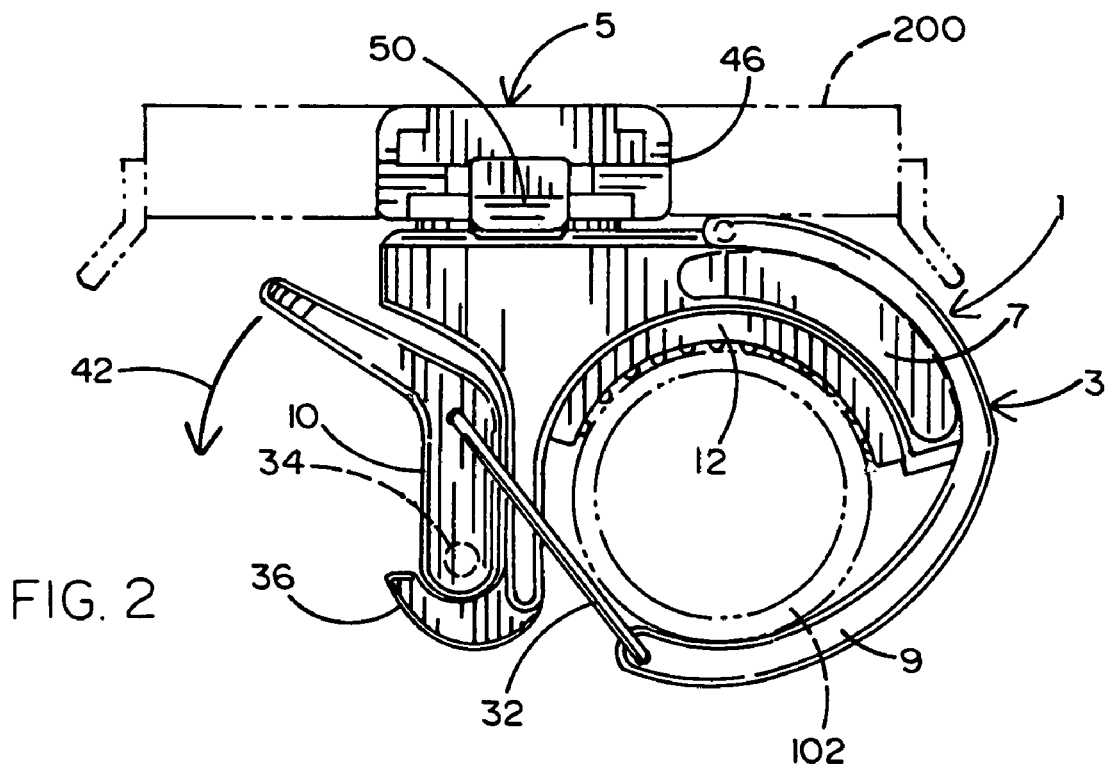
FIGS. 2-4 illustrate the adjustable mounting bracket being detachably connected in surrounding engagement with a structural member (e.g., a handlebar of a bicycle)
Figure 3:
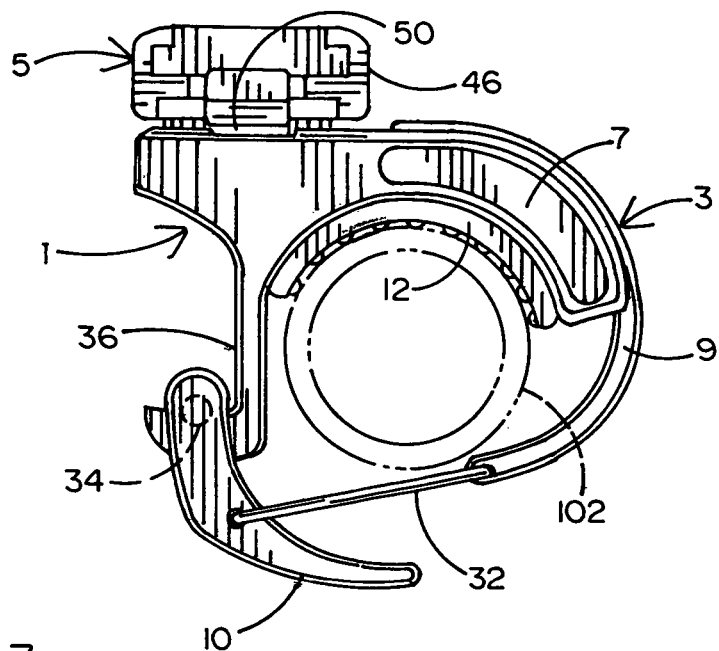
Figure 4:
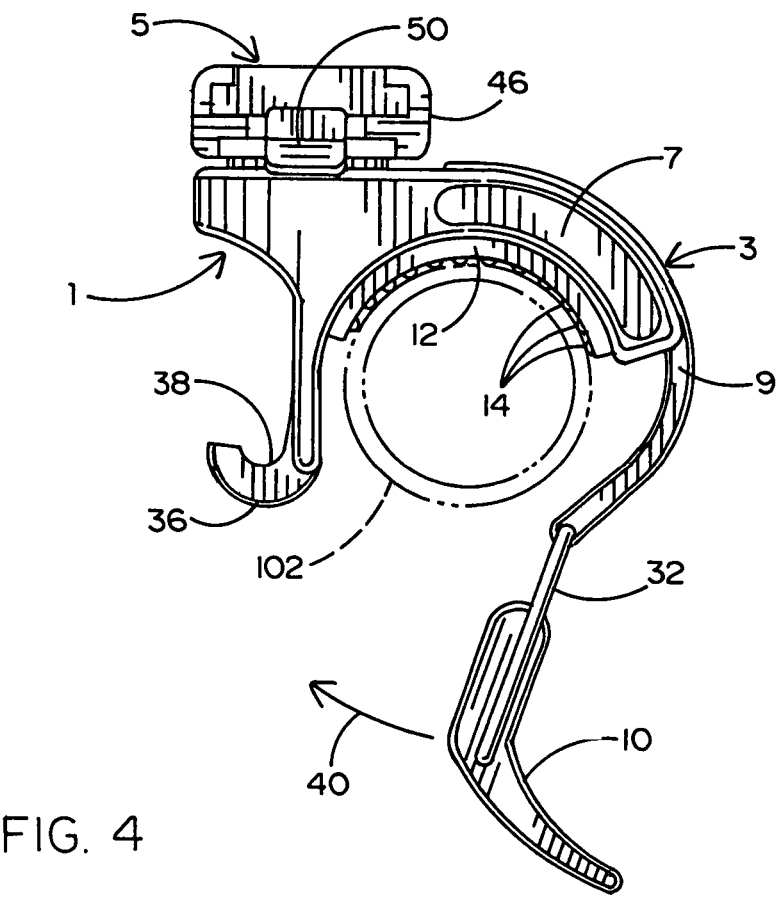
Figures 7, 8:
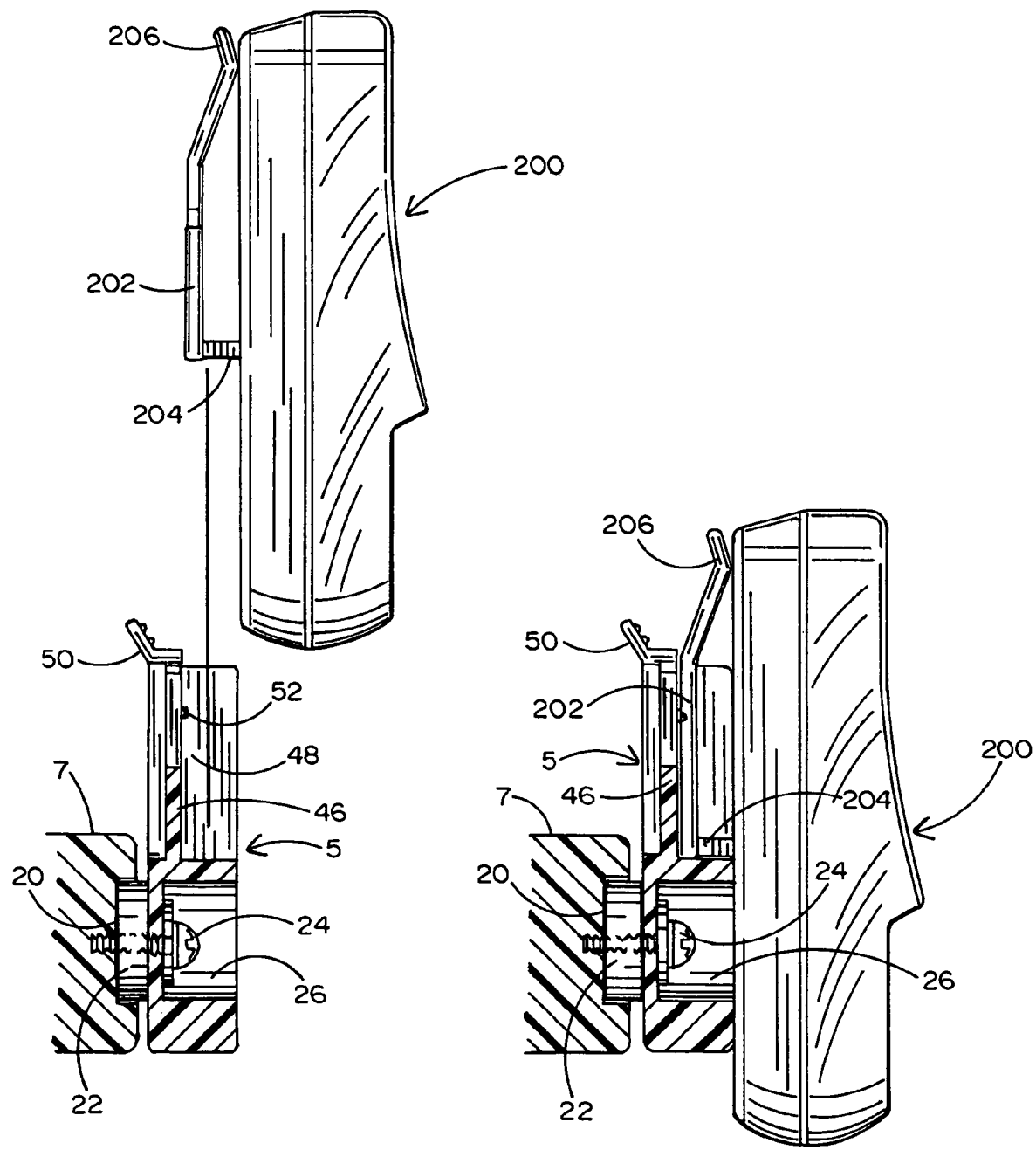
FIGS. 7 and 8 illustrate a light source being removably connected to the light stand of the adjustable mounting bracket.

The light stand support body 7 of the grip 3 of the adjustable mounting bracket 1 has a generally arcuate inside surface that is shaped to surround a cylindrical structural member, such as the aforementioned handlebar 102 of the bicycle 100 of FIG. 8 (also shown in phantom lines in FIGS. 2-4). To this end, a (e.g., rubber) cushion 12 is affixed to the arcuate inside surface of the light stand support body 7. The cushion 12 has a series of ribs 14 (best shown in FIG. 1) formed therein to enable the grip 3 to firmly grasp and hold onto the handlebar 102 or similar round or flat structural support so as to avoid a rotation of the mounting bracket 1 therearound.

The light stand support body 7 of the grip 3 also has an outside surface within which an elongated coupling cavity 16 is formed. Pairs of opposing, axially-arranged coupling pin retaining slots 18 are disposed in spaced parallel alignment with one another along the coupling cavity 16. A cylindrical light stand receptacle 20 is also formed in the outside surface of the light stand support body 7 adjacent the coupling cavity 16. As is best shown in FIGS. 7 and 8, a cylindrical light stand mount 22 which projects from the light stand 5 is received within the cylindrical light stand receptacle 20 of the light stand support body 7. A suitable fastener 24 is moved inside a recess 26 in the light stand 5, through the light stand mount 22 thereof, and into mating engagement with the light stand support body 7 of the grip 3.

Figure 5:
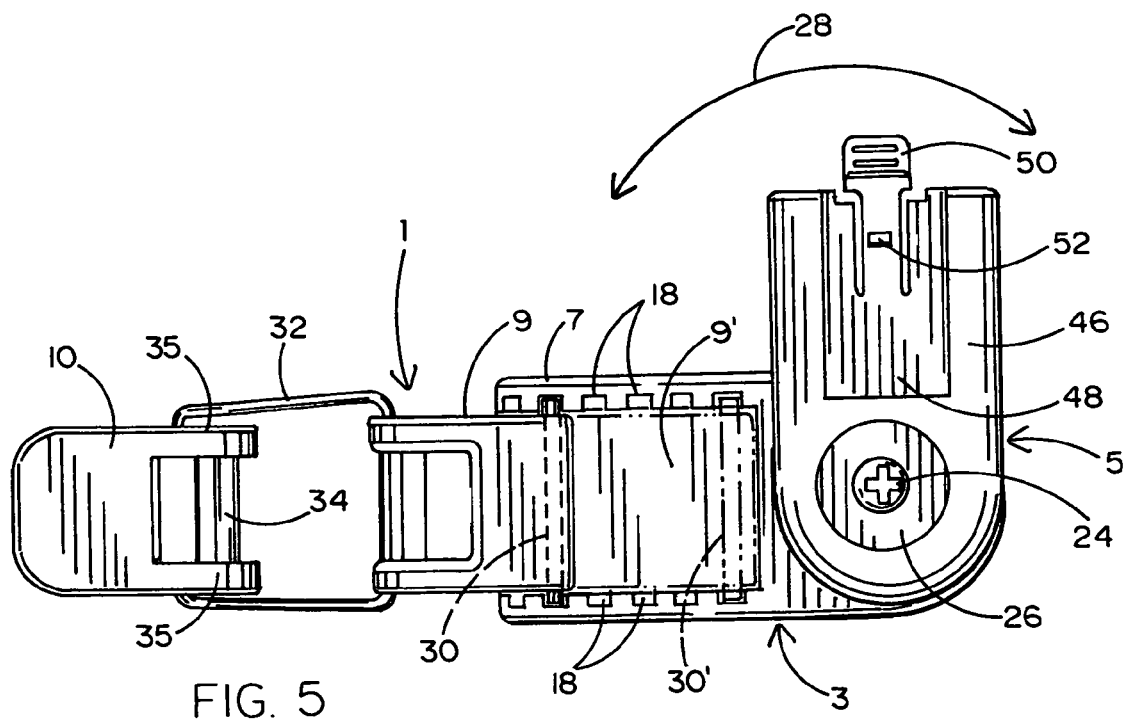
FIGS. 5 and 6 show a light stand pivotally coupled and rotatable relative to a light stand support body of the adjustable mounting bracket.
Figure 6:
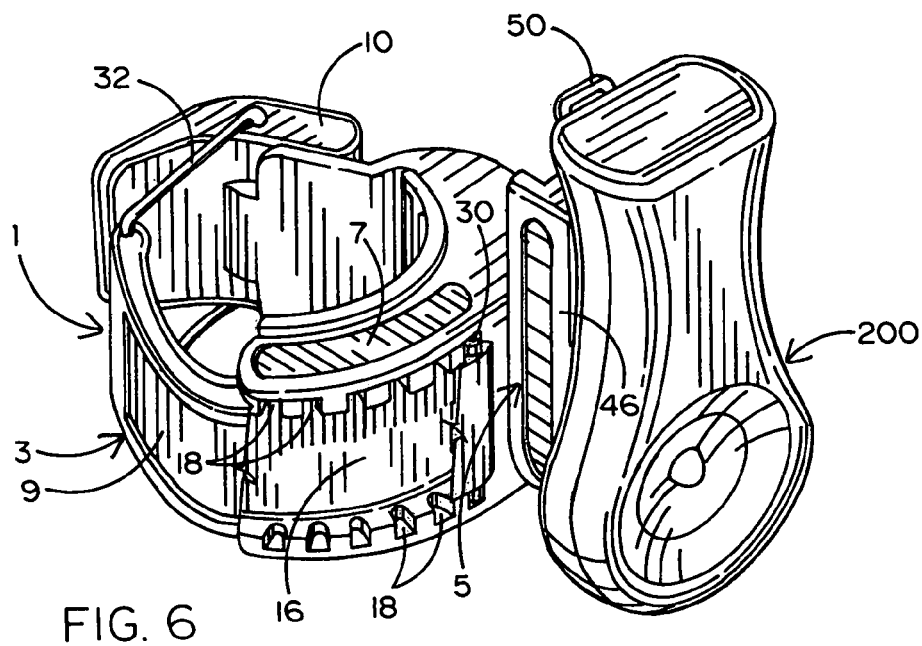

Accordingly, the cylindrical light stand mount 22 of the light stand 5 is pivotally coupled to the light stand support body 7 within the cylindrical light stand receptacle 20, whereby the light stand 5 (as well as the light source 200 removably connected thereto) is rotatable back and forth relative to the light stand support body 7 of grip 3 in the direction of the reference arrow 28 of FIG. 5. By virtue of the foregoing, the position of the light source 200 can be selectively adjusted to suit the needs of the rider/user depending upon his particular circumstances and location.

The clamping band 9 of the grip 3 of the quick-release adjustable mounting bracket 1 is preferably manufactured from flexible rubber so as to be capable of stretching and bending over the handlebar 102 or similar structural member to which the mounting bracket is to be connected. A coupling pin 30 (best shown in FIG. 5) extends laterally across one end of the clamping band 9. One end of a (e.g., metallic) rectangular clip 32 is attached to the opposite end of the clamping band 9. The opposite end of the clip 32 is pivotally connected to the locking latch 10, such that the locking latch 10 is rotatable around the clip 32 in order to be manipulated into position to hold the adjustable mounting bracket 1 in surrounding engagement with the handlebar 102, or the like. The clip 32 links the locking latch 10 to the clamping band 9.

The coupling pin 30 extending across one end of the clamping band 9 of the grip 3 of the quick-release adjustable mounting bracket 1 is snapped into locking receipt by a pair of axially-arranged coupling pin retaining slots 18 that lie in spaced parallel alignment with other pairs of coupling pin retaining slots formed in the coupling cavity 16 at the outside surface of the light stand support body 7. The particular pair of retaining slots 18 chosen to engage the locking pin 30 is dependent upon the size (i.e., diameter) of the handlebar 102 or similar structure around which the clamping band 9 will be bent.

That is, and referring particularly to FIG. 5, in the case where the diameter of the handlebar 102 is relatively large, the coupling pin 30 extending laterally across one end of the clamping band 9 is snapped into receipt by a pair of axially-aligned coupling pin retaining slots 18 at a near end of the coupling cavity 16 formed in the light stand support body 7. However, when the handlebar 102 otherwise has a smaller diameter, the coupling pin (designated 30') of the clamping band (shown in phantom lines and now designated 9') is pulled in a direction towards the light stand 5 so as to be snapped into receipt by a different pair of pin retaining slots 18 at a far end of coupling cavity 16.

As previously disclosed, the locking latch 10 of the grip 3 of the quick-release adjustable mounting bracket 1 is linked to the clamping band 9 by means of the clip 32, whereby the locking latch 10 is rotatable with respect to clamping band 9 around clip 32. The locking latch 10 has a locking bar 34 (best shown in FIG. 5) extending between a pair of spaced, parallel-aligned fingers 35 thereof. As is best shown in FIG. 4, a hook-shaped locking catch 36 having a recess 38 formed therein is coextensively connected to and stands outwardly from the light stand support body 7 of grip 3. As will now be described, the locking bar 34 of locking latch 10 is moved into interlocking engagement with the locking catch 36, whereby to close the grip 3 of mounting bracket 1 around the handlebar 102 so that the mounting bracket 1 is detachably connected to the handlebar.

More particularly, the manner in which the quick-release adjustable mounting bracket 1 is quickly and reliably connected to the handlebar 102 or any other suitable structural member is now described while referring specifically to FIGS. 1-6 of the drawings. The arcuate inside surface of the light stand support body 7 of grip 3 is first located over a portion of the cylindrical handlebar 102 as shown in FIG. 4. The coupling pin 30 extending across one end of the clamping band 9 of grip 3 is then snapped into removable receipt by a particular pair of axially-arranged coupling pin retaining slots 18 formed in the coupling cavity 16 at the outside surface of support body 7 depending upon the diameter of handlebar 102. The coupling pin 30 now functions as a pivot axle that is rotatable within the selected pin retaining slots 18, whereby the first end of the clamping band 9 is pivotally coupled to the light stand support body 7 at the coupling cavity 6 thereof.

Next, the locking latch 10 of the grip 3 is pulled from an unlocked position of FIG. 4 towards the upstanding hook-shaped locking catch 36 in the direction of the reference arrow 40 of FIG. 4. At the same time, the locking latch 10 is rotated around the clip 32 until the flexible clamping band 9 is bent over the handlebar 102 and the locking latch 10 is moved into contact with the upstanding locking catch 36 in the manner shown in FIG. 2. When the locking latch 10 is rotated into contact with the locking catch 36, the locking bar 34 of locking latch 10 will be seated within the recess 38 of locking catch 36. A rotational force applied to the locking latch 10 in the direction of the reference arrow 42 of FIG. 2 is imparted to the locking bar 34 to simultaneously cause the locking bar 34 to rotate within the recess 38 of locking catch 36 and the locking latch 10 to rotate around the clip 32.

The locking latch 10 of grip 3 is rotated at the locking bar 34 thereof with respect to the locking catch 36 through an arc of approximately 180 degrees to a locked position as shown in FIG. 3. Therefore, the grip 3 will be closed and tightened around the handlebar 102, whereby the locking bar 34 of locking latch 10 is pulled against and into interlocking engagement with the hook-shaped locking catch 36 at the recess 38 thereof to prevent the locking latch 10 from inadvertently rotating to the unlocked position of FIG. 4. Accordingly, the quick-release adjustable mounting bracket 1 will be held in tight surrounding engagement with the handlebar 102 regardless of its diameter.

In this same regard, the adjustable mounting bracket 1 can be quickly and easily released and separated from the handlebar 102 by simply rotating the locking latch 10 of grip 3 from the locked position of FIG. 3 to the unlocked position of FIG. 4. In this case, a rotational force is applied to the locking latch 10 in a direction opposite to that represented by the reference arrow 42 of FIG. 2, whereby the locking latch 10 is moved out of engagement with the locking catch 36 and the grip 3 is opened so that mounting bracket 1 can be removed from the handlebar 102.

Details of the rotatable light stand 5 that is pivotally coupled to the grip 3 of the quick-release adjustable mounting bracket 1 are now disclosed while referring concurrently to FIGS. 5-8 of the drawings. The light stand 5 has a body 46 wherein the recess 26 is formed at one end thereof to receive the fastener 24 by which the light stand 5 is pivotally coupled to the light stand support body 7 of the grip 3. A longitudinally-extending channel 48 is formed in the opposite end of the light stand body 46 to slidably receive the light source 200. A flexible upstanding locking arm 50 formed at the top of the light stand body 46 communicates with channel 48 to capture and releasably retain the light source 200 after the light source 200 has been moved into sliding engagement with the light stand 5 at the channel 48 of body 46. A locking tab 52 (best shown in FIG. 5) projects from the locking arm 50 inwardly of the channel 48.

As was earlier disclosed, the light source 200 is a commercially-available flashing bright light source that is attached to and carried by a bicycle, or the like, by means of the light stand 5 of the quick-release mounting bracket 1. The particular light source 200 that is slidably and removably received within the channel 48 of the light stand 5 forms no part of this invention. By way of example only, the light source 200 includes a flashing light emitting diode that is powered by a pair of AAA 1.5 volt batteries. In the present example, the light source 200 has a flexible clip 202 (best shown in FIGS. 7 and 8) at the back thereof. The flexible clip 202 has closed and open ends 204 and 206 which permit the light source to be clipped (via the open end 206) to a user's shirt pocket at those times when the light source is detached from the mounting bracket 1.

In this regard, the channel 48 formed in the body 46 of the light stand 5 of the adjustable mounting bracket 1 is sized to accommodate the clip 202 of the light source 200 therewithin. As is best shown in FIG. 7, the light source 200 is moved toward the light stand 5 such that the light source clip 202 is pushed into sliding engagement with the channel 48 of the light stand. In this example, the light source 200 is turned so that the closed end 204 of the clip 202 is moved completely through the channel 48.

As the clip 202 of light source 200 slides through the channel 48 in the body 46 of light stand 5, the flexible locking arm 50 at the top of light stand body 46 will be momentarily pushed rearwardly and out of the channel 48. The locking tab 52 of locking arm 50 will then snap into receipt by a correspondingly sized and shaped locking slot (not shown) that is formed in the clip 202 of light source 200. The flexible nature of the locking arm 50 urges the locking arm 50 to automatically return to the channel 48 so that the locking tab 52 thereof will be pushed into the locking slot of the clip 202 to releasably retain the light source 200 within the channel 48 of the body 46 of light stand 5. As previously explained, the position of the light source 200 relative to the mounting bracket 1 can be advantageously changed by merely rotating the light stand 5 around the fastener 24 in the direction of the reference arrows 28 of FIG. 5.

When it is desirable to remove the light source 200 from the light stand 5, a pushing force is applied against the locking arm 50 to correspondingly pull the locking tab 52 thereof out of receipt by the locking slot that is formed in the clip 202 at the back of light source 200. A pulling force applied to the light source 200 causes the clip 202 thereof to slide outwardly through the channel 48 of light stand body 46, whereby the light source 200 is separated from the light stand 5 of mounting bracket 1.

The quick-release adjustable mounting bracket 1 of this invention may be easily removed from the bicycle 100 of FIG. 9 without the use of tools in the manner described while referring to FIGS. 1-6 so as to be attached to a different structural member or simply put away to await a future application. Thus, it may be appreciated that neither the mounting bracket 1 nor the light source 200 carried thereby need remain attached when the bicycle is not in use so as to avoid a loss or theft of the mounting bracket 1 and/or the light source 200.

The invention claimed is:

1. An adjustable mounting bracket to be detachably connected to a structural member to enable an auxiliary device to be carried by the structural member, said adjustable mounting bracket comprising:
   a bracket body to be moved into engagement with the structural member;
   a receptacle to which the auxiliary device is to be attached, said receptacle coupled to said bracket body;
   a first catch located on said bracket body;
   a plurality of second catches located on said bracket body and spaced from said first catch; and
   a clamping band sized to surround at least a portion of the structural member, said clamping band having a first end to be releasably connected to said first catch and an opposite end including a coupling pin to be releasably connected to a particular one of said plurality of second catches depending upon the size of the structural member.

2. The adjustable mounting bracket recited in claim 1, wherein said receptacle to which the auxiliary device is to be attached is pivotally coupled to said bracket body so that said receptacle and the auxiliary device to be attached thereto are rotatable relative to said bracket body.

3. The adjustable mounting bracket recited in claim 1, wherein said receptacle has a channel adapted to slidably receive the auxiliary device therewithin, and a flexible locking arm communicating with the channel so as to be positioned to engage and retain the auxiliary device slidably received within the channel of said receptacle, whereby the auxiliary device will be attached to said receptacle.

4. The adjustable mounting bracket recited in claim 1, wherein said first catch includes a locking tab projecting from said bracket body and the first end of said clamping band includes a locking latch, said locking latch being moved into removable engagement with said locking tab, whereby the first end of said clamping band is releasably connected to said first catch at said locking tab thereof.

5. The adjustable mounting bracket recited in claim 4, wherein the locking tab of said first catch projecting from said bracket body is a locking hook.

6. The adjustable mounting bracket recited in claim 5, wherein said locking latch is pivotally coupled to the first end of said clamping band, such that said locking latch is rotatable relative to said clamping band into said removably engagement with said locking hook.

7. The adjustable mounting bracket recited in claim 6, wherein said locking latch includes a locking bar, said locking latch being rotated relative to said clamping band in response to a rotational force applied to said locking latch, such that said locking bar is correspondingly pulled into removable engagement with said locking hook.

8. The adjustable mounting bracket recited in claim 1, wherein said clamping band is rotatable at said coupling pin at the opposite end of said clamping band towards said first catch when said coupling pin is releasably connected to the particular one of said plurality of second catches, such that the first end of said clamping band can be releasably connected to said first catch.

9. The adjustable mounting bracket recited in claim 1, wherein said plurality of second catches are a corresponding plurality of coupling pin retaining slots formed in said bracket body, said coupling pins pin releasably connected to a particular one of said plurality of coupling pin retaining slots.

10. The adjustable mounting bracket recited in claim 9, wherein said plurality of coupling pin retaining slots are formed in said bracket body so as to lie in spaced, parallel alignment with one another.

11. The adjustable mounting bracket recited in claim 1, wherein said clamping band is flexible so as to be adapted to bend around the portion of the structural member to which said mounting bracket is to be detachably connected.

12. An adjustable mounting bracket to be detachably connected to a structural member to enable an auxiliary device to be carried by the structural member, said adjustable mounting bracket comprising:
a bracket body to be moved into engagement with the structural member;
a receptacle to which the auxiliary device is to be attached, said receptacle pivotally coupled to said bracket body so that said receptacle and the auxiliary device attached thereto are rotatable relative to said bracket body;
a locking hook projecting from said bracket body;
a plurality of catches located on said bracket body and spaced from said locking hook; and
a clamping band sized to surround at least a portion of the structural member, said clamping band having a locking latch at a first end thereof to be releasably connected to said locking hook and a coupling pin at an opposite end to be releasably connected to a particular one of said plurality of catches depending upon the size of the structural member.

13. The adjustable mounting bracket recited in claim 12, wherein said plurality of catches are a corresponding plurality of coupling pin retaining slots formed in said bracket body and arranged in spaced parallel alignment with one another, said coupling pin being removably received within a particular one of said plurality of coupling pin retaining slots.

14. The adjustable mounting bracket recited in claim 13, wherein said clamping band is flexible, said flexible clamping band being rotated at said coupling pin when said coupling pin is removably received within the particular one of said plurality of coupling pin retaining slots, said flexible clamping band adapted to be bent over the portion of the structural member to which said mounting bracket is to be detachably connected so that the locking latch at the first end of said clamping band is moved towards and releasably connected to said locking hook.

15. An adjustable mounting bracket to be detachably connected to a structural member to enable an auxiliary device to be carried by the structural member, said adjustable mounting bracket comprising:
a bracket body to be moved into engagement with the structural member;
a receptacle to which the auxiliary device is to be attached, said receptacle coupled to said bracket body;
a first catch located on said bracket body, said first catch having a locking hook;
a plurality of second catches located on said bracket body and spaced from said first catch; and
a clamping band sized to surround at least a portion of the structural member, said clamping band having a first end and a locking latch pivotally coupled to said first end to be rotated relative to said clamping band towards and releasably connected to the locking hook of said first catch on said bracket body, and an opposite end to be releasably connected to a particular one of said plurality of second catches depending upon the size of the structural member.

16. The adjustable mounting bracket recited in claim 15, wherein the locking latch pivotally coupled to the first end of said clamping band includes a locking bar, said locking latch being rotated relative to said clamping band in response to a rotational force applied to said locking latch, such that said locking bar is correspondingly pulled into removable engagement with said locking hook.

17. The adjustable mounting bracket recited in claim 15, wherein the opposite end of said clamping band includes a coupling pin to be releasably connected to the particular one of said plurality of second catches located on said bracket body depending upon the size of the structural member.

18. The adjustable mounting bracket recited in claim 17, wherein said clamping band is rotatable at said coupling pin towards the locking hook of said first catch when said coupling pin is releasably connected to the particular one of said plurality of second catches, such that the first end of said clamping band can be releasably connected to said locking hook.

19. The adjustable mounting bracket recited in claim 17, wherein said plurality of second catches are a corresponding plurality of coupling pin retaining slots formed in said bracket body, said coupling pin being releasably connected to a particular one of said plurality of coupling pin retaining slots.

20. The adjustable mounting bracket recited in claim 19, wherein said plurality of coupling pin retaining slots are formed in said bracket body so as to lie in spaced, parallel alignment with one another.

\* \* \* \* \*